Patented Aug. 27, 1940

2,212,992

UNITED STATES PATENT OFFICE 2,212,992

ANTIKNOCK FUEL

Frank J. Sowa, South Bend, Ind., assignor to International Engineering Corporation, Chicago, Ill., a corporation of Illinois No Drawing. Application June 22, 1938, Serial No. 215,232

16 Claims. (Cl. 44—9)

This invention relates to fuels for use in internal combustion engines, and particularly to hydrocarbon fuels such as gasoline having an antiknock agent in solution.

The most effective antiknock fuels now in use utilize metallic reagents which, while effective in increasing the octane rating of the fuel, have undesirably high boiling points and are hard to handle with safety because of their toxis qualities. An object of the present invention is to provide an effective antiknock agent of a non-metallic and non-toxic nature, having approximately the same boiling point as the gasoline or other hydrocarbon material with which it is mixed.

Such improved antiknock agents include a group of silicon compounds, most of them having a single silicon atom in the molecule. Compounds are preferred which cannot form silicic acid upon reacting with water. Silicic acid is a gelatinous material which might block carburetor jets and the like.

The most effective of these agents are selected from the group consisting of silicols and silicyl ethers. A silicol may be defined as a compound of the general formula:

where R, R' and R'' may be alkyl groups or silicyl alkyl groups or hydrogen atoms or a combination thereof. A preferred example is triethyl silicol:

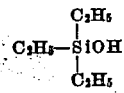

Other examples are triethyl silicol, diethyl methyl silicol, dimethyl propyl silicol, and dimethyl butyl silicol.

A silicyl ether may be defined as a compound of the general formula:

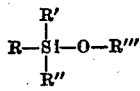

where R''' is an alkyl group such as CH$_3$, C$_2$H$_5$, C$_3$H$_7$, C$_4$H$_9$, or C$_5$H$_{11}$. A preferred example is triethyl silicyl ethyl ether. Other examples are the methyl and propyl triethyl silicyl ethers, and the diethyl methyl silicyl alkyl ethers, dimethyl propyl silicyl alkyl ethers, and the dimethyl butyl silicyl alkyl ethers.

The silicols and silicyl ethers may be prepared by reacting a silicon compound, preferably an organic compound of silicon or a silicon halide with a Grignard reagent and hydrolyzing the resulting product.

The magnesium Grignard reagents are preferably used and are reacted with such compounds as the organic silicates or silicon tetrachloride or silicon tetrafluoride. This reaction serves to substitute the organic radical of the Grignard reagent for the alkoxy or halide groups of the silicon compounds. The extent of the substitution depends upon the ratio of the quantities of the two reagents used. To obtain the desired products, three mols of the Grignard reagent are reacted with one mol of the silicate in order that three organic radicals may be substituted.

The preparation of triethyl silicyl ether may be taken as a specific example of the process. To prepare this substance, four and one-half mols of magnesium ethyl chloride, prepared in the usual way, are added slowly to an ether solution of one and one-half mols of ethyl orthosilicate. After 15 minutes the reaction is practically complete and the ether and alcohol may be distilled off. The resulting product, comprising chiefly triethyl silicyl ethyl ether may be readily separated from the Grignard residue by distillation.

If it is desired to prepare the silicol, the product of the Grignard reaction, after the ether and alcohol are removed, may be heated with a 50% solution of sodium hydroxide. After 30 minutes the hydrolysis is practically complete and the alcohol is removed by distillation. The product may then be neutralized, washed with water, and fractionated to remove triethyl silicol.

It is believed that the reactions are of the type exemplified by the following equations:

1. Preparation of the Grignard reagent:

*Ether solution*

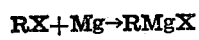

in which R is an organic radical and X a halogen.

2. Reaction of Grignard and silicon compound:

*Ether solution*

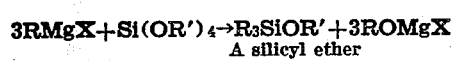

3. Hydrolysis:

*Acid or base*

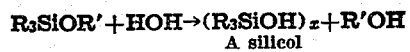

The above materials may be used alone, or in solution in diamylamine or a halogenated hydrocarbon or the like. The quantities required to be added to the untreated fuel are substantially the same by weight as the metallic derivative antiknock compounds now in use, as for example tetraethyl lead.

An antiknock fuel of the above-described composition, when used in an internal combustion engine, also serves to clean out carbon deposits in the engine cylinders, by causing it to flake or by accelerating its oxidation. I have noted that the increase in octane value does not always take effect immediately when the improved fuel is first used in an engine, and likewise the effect does not cease immediately when untreated fuel is used. From this I deduce that the antiknock effect is due at least in part to the formation of activated surfaces in the engine cylinder. I have also found that the use of the improved fuel definitely loosens up any carbon deposit and causes it to flake off.

While particular examples and their use have been described in detail, it is not my intention to limit the scope of the invention by that description, or otherwise than by the terms of the appended claims.

I claim:

1. A fuel for use in an internal combustion engine comprising a liquid hydrocarbon fuel material and a material selected from the group of compounds consisting of alkyl silicols and alkyl silicyl ethers, the alkyl radicals in said compounds having less than 6 carbon atoms therein.

2. A fuel for use in an internal combustion engine comprising a liquid hydrocarbon fuel material and a alkyl silicol, the alkyl radicals in said silicol having less than 6 carbon atoms therein.

3. A fuel for use in an internal combustion engine consisting of a liquid hydrocarbon fuel material and an alkyl silicol, the alkyl radicals in said silicol having less than 6 carbon atoms therein, said silicol being dissolved in diamylamine or a halogenated hydrocarbon.

4. A fuel for use in an internal combustion engine consisting of a liquid hydrocarbon fuel material and an alkyl silicol, the alkyl radicals in said silicol having less than 6 carbon atoms therein, said silicol being dissolved in diamylamine.

5. A fuel for use in an internal combustion engine consisting of a liquid hydrocarbon fuel material, and an alkyl silicol, the alkyl radicals in said silicol having less than 6 carbon atoms therein.

6. A fuel for use in an internal combustion engine consisting of a liquid hydrocarbon fuel material, and triethyl silicol dissolved in diamylamine or a halogenated hydrocarbon.

7. A fuel for use in an internal combustion engine consisting of a liquid hydrocarbon fuel material, and triethyl silicol dissolved in diamylamine.

8. A fuel for use in an internal combustion engine consisting of a liquid hydrocarbon fuel material, and triethyl silicol.

9. A fuel for use in an internal combustion engine consisting of a liquid hydrocarbon fuel material, and triethyl silicol dissolved in a halogenated hydrocarbon.

10. A fuel for use in an internal combustion engine consisting of a liquid hydrocarbon fuel material, and a triethyl silicyl alkyl ether dissolved in diamylamine or a halogenated hydrocarbon.

11. A fuel for use in an internal combustion engine consisting of a liquid hydrocarbon fuel material, and a triethyl silicyl alkyl ether dissolved in diamylamine.

12. A fuel for use in an internal combustion engine consisting of a liquid hydrocarbon fuel material, and a triethyl silicyl alkyl ether.

13. A fuel for use in an internal combustion engine consisting of a liquid hydrocarbon fuel material, and a triethyl silicyl alkyl ether dissolved in a halogenated hydrocarbon.

14. A fuel for use in an internal combustion engine consisting of a liquid hydrocarbon fuel material, and a silicyl alkyl ether, the alkyl radicals in said ether having less than 6 carbon atoms therein, said ether being dissolved in diamylamine or a halogenated hydrocarbon.

15. A fuel for use in an internal combustion engine consisting of a liquid hydrocarbon fuel material, and a silicyl alkyl ether, the alkyl radicals in said ether having less than 6 carbon atoms therein, said ether being dissolved in diamylamine.

16. A fuel for use in an internal combustion engine consisting of a liquid hydrocarbon fuel material, and a silicyl alkyl ether, the alkyl radicals in said ether having less than 6 carbon atoms therein.

FRANK J. SOWA.